United States Patent
Rawlings et al.

(10) Patent No.: US 7,587,253 B2
(45) Date of Patent: Sep. 8, 2009

(54) PARTIAL ENUMERATION MODEL PREDICTIVE CONTROLLER

(75) Inventors: James B. Rawlings, Madison, WI (US); Stephen J. Wright, Madison, WI (US); Gabriele Pannocchia, Leghorn (IT)

(73) Assignee: WARF (Wisconsin Alumni Research Foundation), Madison, WI (US)

( * ) Notice: Subject to any disclaimer, the term of this patent is extended or adjusted under 35 U.S.C. 154(b) by 210 days.

(21) Appl. No.: 11/461,679

(22) Filed: Aug. 1, 2006

(65) Prior Publication Data

US 2008/0071397 A1  Mar. 20, 2008

(51) Int. Cl.
*G05B 13/02* (2006.01)
(52) U.S. Cl. .............................. 700/53; 700/29; 700/44
(58) Field of Classification Search .................. 700/28, 700/29, 31, 44, 45, 53, 92
See application file for complete search history.

(56) References Cited

U.S. PATENT DOCUMENTS

| | | | |
|---|---|---|---|
| 6,587,744 B1 * | 7/2003 | Stoddard et al. | 700/29 |
| 6,622,645 B2 * | 9/2003 | Havlena | 110/348 |

* cited by examiner

*Primary Examiner*—Charles R Kasenge
(74) *Attorney, Agent, or Firm*—Cardinal Law Group

(57) ABSTRACT

A partial enumeration model predictive controller and method of predictive control for a multiple input, multiple output (MIMO) system, including providing a solution table with problem solutions to a model predictive control problem for the MIMO system over a partial parameter region; scanning the solution table for an optimal solution for current parameters; using the optimal solution to control the MIMO system when the optimal solution is in the solution table; and using an alternative solution to control the MIMO system when the optimal solution is not in the solution table.

22 Claims, 4 Drawing Sheets

PARTIAL ENUMERATION MODEL PREDICTIVE CONTROLLER

STATEMENT OF GOVERNMENT RIGHTS

This invention was made with United States government support awarded by the following agency: NSF #CTS-0105360. The United States government has certain rights in this invention.

TECHNICAL FIELD

This invention relates to system controllers, and more particularly, to a partial enumeration model predictive controller.

BACKGROUND OF THE INVENTION

Systems can be defined generally as an object in which signals interact to produce an observable output signal. The system can be a physical entity, such as a chemical process, an electrical circuit, or an engine. The system can also be an abstract entity, such as the stock market or a financial system. One important type of system is the multiple input, multiple output (MIMO) system. As the name suggests, a MIMO system has multiple inputs and multiple outputs, in contrast to single input, single output (SISO) systems. MIMO systems are commonly controlled using model-based control methods, such as linear quadratic (LQ) control or model predictive control (MPC).

Model predictive control is the dominant advanced control method in process industries for control of large-scale MIMO processes. MPC systems use a model of the MIMO system and make control decisions based on the model. MPC systems are popular for complex systems because they can explicitly optimize the process, handle complex multivariate processes, and account for system constraints, such as valve motion limits. In spite of these benefits, existing MPC systems present problems that prevent widespread use. MPC systems run too slowly for large-scale processes, processes with long time delays, and processes with fast sampling times. MPC systems also run too slowly when the problem being solved has long control horizons. Specific problems that cause the MPC systems to run slowly include solution tables becoming so large as to prevent searching in a reasonable time and solution tables lacking the optimal solution. Performance of the MPC system often suffers when a suboptimal solution is used.

Previous attempts to use MPC systems for complex MIMO processes have used complete enumeration strategies, i.e., strategies which solve the MIMO system over the whole parameter region for all possible solutions. One example of a complete enumeration strategy for solving the MPC systems formulated as quadratic programs is a multi-parametric quadratic programming solver technique, which can use active set techniques or interior point quadratic programming solver techniques to compute the optimal solution for each current parameter. The number of computations involved in these complete enumeration strategies grows rapidly with the number of dimensions and length of the horizon, making the strategies slow to run and unsuitable for real time control of complex MIMO processes.

It would be desirable to have a partial enumeration model predictive controller that would overcome the above disadvantages.

SUMMARY OF THE INVENTION

One aspect of the present invention provides a method of predictive control for a multiple input, multiple output (MIMO) system, including providing a solution table with problem solutions to a model predictive control problem for the MIMO system over a partial parameter region, scanning the solution table for an optimal solution for current parameters, using the optimal solution to control the MIMO system when the optimal solution is in the solution table, and using an alternative solution to control the MIMO system when the optimal solution is not in the solution table.

Another aspect of the present invention provides a system of predictive control for a multiple input, multiple output (MIMO) system, including means for providing a solution table with problem solutions to a model predictive control problem for the MIMO system over a partial parameter region, means for scanning the solution table for an optimal solution for current parameters, means for using the optimal solution to control the MIMO system when the optimal solution is in the solution table, and means for using an alternative solution to control the MIMO system when the optimal solution is not in the solution table.

Another aspect of the present invention provides a computer readable medium storing a computer program for predictive control for a multiple input, multiple output (MIMO) system, including computer readable code for providing a solution table with problem solutions to a model predictive control problem for the MIMO system over a partial parameter region, computer readable code for scanning the solution table for an optimal solution for current parameters, computer readable code for using the optimal solution to control the MIMO system when the optimal solution is in the solution table, and computer readable code for using an alternative solution to control the MIMO system when the optimal solution is not in the solution table.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE INVENTION

Figure 1:
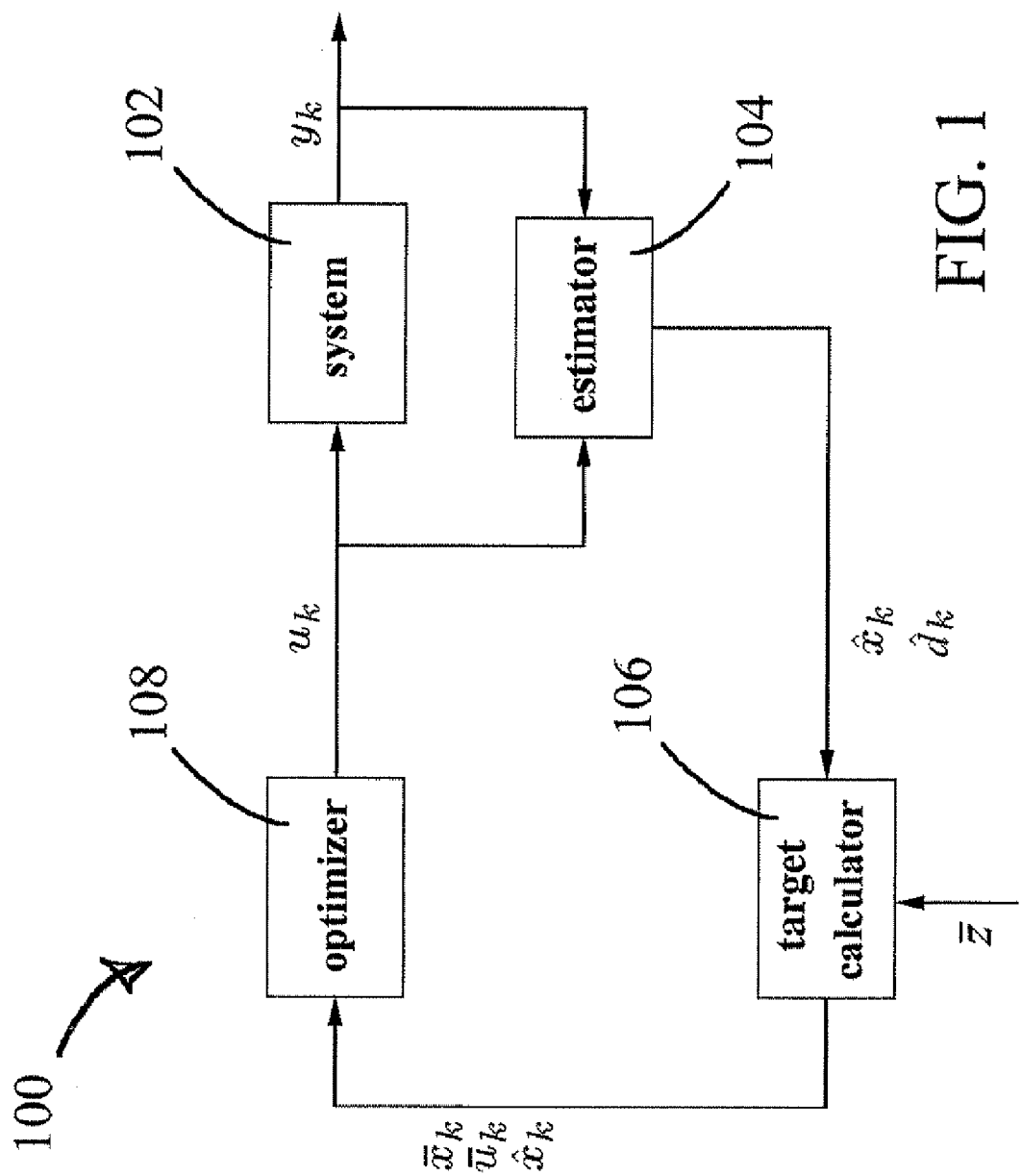
FIG. 1 is a block diagram of a partial enumeration model predictive controller made in accordance with the present invention.

FIG. 1 is a block diagram of a partial enumeration model predictive controller made in accordance with the present invention. The partial enumeration model predictive controller 100 controls a system 102 having an input $u_k$ and an measured output $y_k$. The partial enumeration model predictive controller 100 includes a state and disturbance estimator 104 receiving the input $u_k$ and the output $y_k$, and generating an estimated state x*hat*k and a estimated disturbance d*hat*k; a constrained target calculator 106 receiving the estimated disturbance d*hat*k and a steady state target output z*bar, and generating a steady state target state x*bar*k and a steady state target input u*bar*k; and a constrained dynamic optimizer 108 receiving the estimated state x*hat*k, the estimated disturbance d*hat*k, the steady state target state x*bar*k, and the steady state target input u*bar*k, and generating an optimized input $u_k$. Those skilled in the art will appreciate that there is an implicit time shift in the variables of FIG. 1. The $u_k$ received at the state and disturbance estimator 104 is the previous input, i.e., $u_{k-1}$. The output $y_k$, estimated state x*hat*k, and estimated disturbance d*hat*k depend on $u_{k-1}$. The steady state target state x*bar*k and steady state target input u*bar*k are computed and a present $u_k$ computed, which will affect $y_{k+1}$.

The system 102 is any multiple input, multiple output (MIMO) system, having an input $u_k$ and output $y_k$. The system 102 can be linear or non-linear. The state of the system 102 is described with a state vector $x_k$. The system can be a physical entity, such as a chemical process, an electrical circuit, or an engine, or an abstract entity, such as a financial system. A linear time-invariant model augmented with integrating states to remove offset for the system 102 can be written as:

$$x_{k+1} = Ax_k + Bu_k + B_d d_k$$

$$d_{k+1} = d_k$$

$$y_k = Cx_k + C_d d_k, \quad (1)$$

where the state x is a real state vector, the input u is a real input vector, the output y is a real output vector, and the disturbance d is a real disturbance vector. A, B, C, $B_d$, and $C_d$ are fixed matrix model factors representing the system 102. The sampling time k is a non-negative integer. The state x and input u is constrained without loss of generality by the following hard constraint:

$$Du_k - Gx_k \leq h \quad (2)$$

where D and G are matrices of appropriate dimensions. The hard constraint accounts for limitations on the input to the system 102, such as input bound and input rate-of-change constraints. Examples of such constraints are valve travel limits in a chemical process or current limits in an electrical circuit. Those skilled in the art will appreciate that the constraints can be hard constraints, such as the hard constraint of this example, and/or soft constraints, such as output constraints. Those skilled in the art will also appreciate that the system 102 can be any number of MIMO systems.

Figure 2:
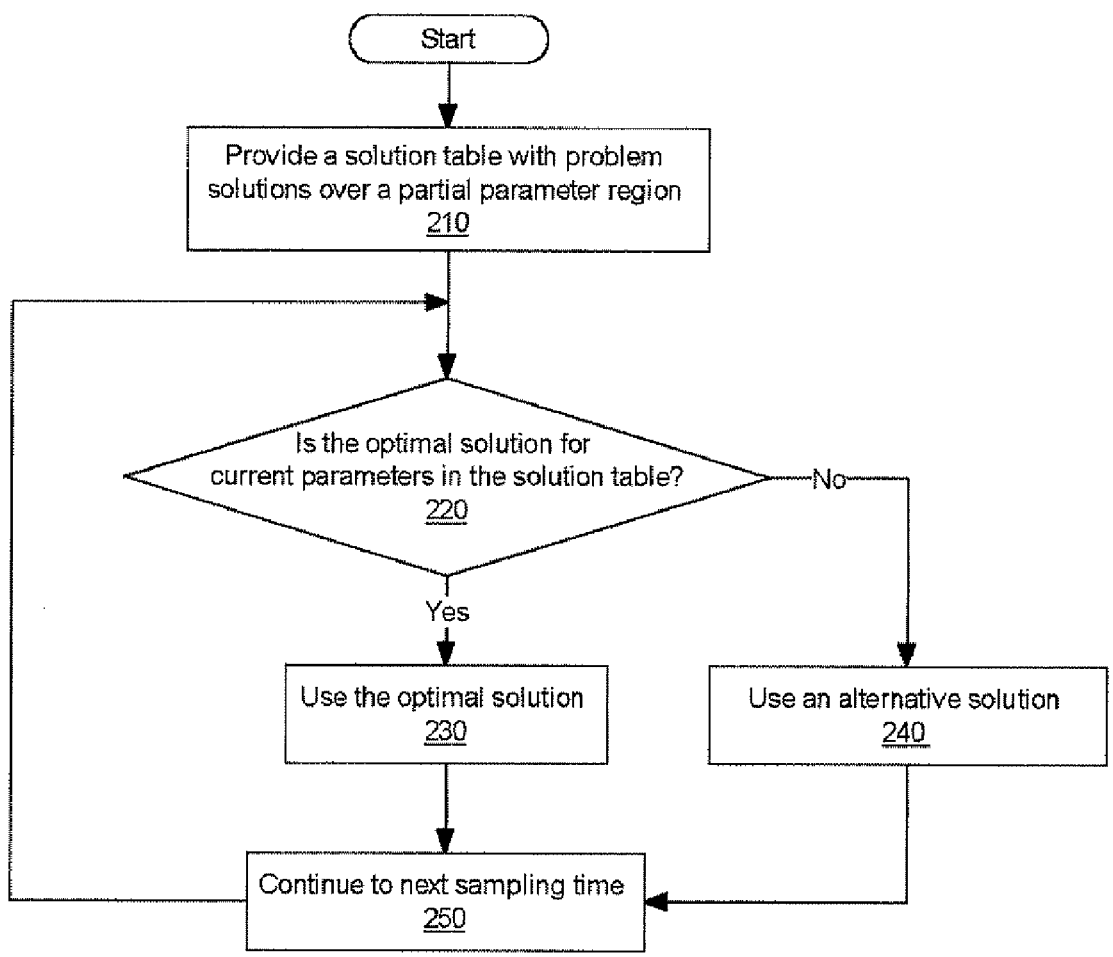
FIG. 2 is a flow chart of a method of model predictive control for a MIMO system made in accordance with the present invention.

FIG. 2 is a flow chart of a method of model predictive control for a MIMO system made in accordance with the present invention. The method is a partial enumeration method, i.e., problem solutions are provided over a partial parameter region rather than the including all problem solutions.

The method includes providing a solution table with problem solutions to a model predictive control problem for the MIMO system over a partial parameter region 210, scanning the solution table for an optimal solution for current parameters 220, using the optimal solution to control the MIMO system when the optimal solution is in the solution table 230, and using an alternative solution to control the MIMO system when the optimal solution is not in the solution table 240. The method can then continue scanning the solution table for the next optimal solution for the next sampling time 250. The alternative solution can be a best suboptimal solution, a predetermined time current solution, or a simplified model current solution. The solution table can be provided by modeling the MIMO system with model factors, generating the model predictive control problem from the model factors, solving the model predictive control problem for the problem solutions offline, and populating the solution table with the problem solutions.

The method can further include calculating a current solution to the model predictive control problem for the MIMO system for the current parameters when the optimal solution is not in the solution table and adding the current solution to the solution table. An old problem solution, such as a least used solution or a least recently used solution, can be deleted when the current solution is added to maintain the solution table at a predetermined length. The addition to the solution table can also be a solution family related to the current solution. The method can further include determining a use score for each of the problem solutions over a predetermined number of sampling times, so that the scanning the solution table for an optimal solution includes scanning the problem solutions in order of the use score from most used to least used. The method can further include determining an age for each of the problem solutions, so that the scanning the solution table for an optimal solution includes scanning the problem solutions in order of the age from newest to oldest.

Providing a solution table with problem solutions to a model predictive control problem for the MIMO system over a partial parameter region 210 typically includes modeling the MIMO system with model factors, generating the model predictive control problem from the model factors, determining the partial parameter region for an expected operating state, solving the model predictive control problem offline for the problem solutions in the partial parameter region, and populating the solution table with the problem solutions. Modeling the MIMO system with model factors includes modeling the MIMO system as a linear time-invariant model with model factors as discussed above for FIG. 1.

Generating the model predictive control problem from the model factors includes formulating a target calculation that computes the steady state target state and the steady state target input. The estimator calculates estimated state x*hat*k|k and estimated disturbance d*hat*k|k, based on the current measured output $y_k$. The model assumes that the estimated state x*hat*k|k and estimated disturbance d*hat*k|k are available at every sampling time. The model also assumes that it is possible to make a linear transformation $z = C_z y$ of the output y with known setpoints z*bar. The z is typically a subvector of the output y.

The target calculator computes the steady state target state and the steady state target input at each sampling time from the estimated state x*hat*k|k, estimated disturbance d*hat*k|k, and desired output z*bar. The target calculation computes the targets that may drive the controlled variables to their setpoints within the constraints, such as the hard constraints of Equation (2). The target calculation formulation can be selected as desired from a number of possible formulations, such as linear objective functions, quadratic objective functions, hard constraint functions with precedence rank ordering, soft constraint functions, multi-stage quadratic objective functions, or the like.

In this example, the target calculation formulation is a two-stage quadratic objective functions approach. A first quadratic program is written as:

$$\min_{\bar{u}_k - \bar{x}_k} \frac{1}{2}(\bar{u}_k - \bar{u})' R_s (\bar{u}_k - \bar{u}) \tag{3a}$$

subject to $$\bar{x}_k = A\bar{x}_k + B\bar{u}_k + B_d \hat{d}_{k|k} \tag{3b}$$

$$\bar{z} = C_z(C\bar{x}_k + C_d \hat{d}_{k|k}) \tag{3c}$$

$$D\bar{u}_k - G\bar{x}_k \leq h \tag{3d}$$

where $R_s$ is a positive definite matrix, u*bar is the steady state desired input, and z*bar is the steady state desired output setpoint. The steady state desired input u*bar and the steady state desired output setpoint z*bar are desired values, whereas the results of the target calculation, steady state target input u*bar*k and steady state target state x*bar*k, are the targets.

In some cases, the first quadratic program of Equation (3) is infeasible, i.e., the estimated state, estimated disturbance, and steady state target output may not be able to provide a satisfactory steady state target state and the steady state target input satisfying the first quadratic program due to conflicting constraints and/or requirements. When the first quadratic program of Equation (3) is infeasible, a second quadratic program is provided to supply an offset, which allows the controlled variables z to track to the setpoint vector z*bar.

The second quadratic program aimed at minimizing the offset is written as:

$$\min_{\bar{u}_k - \bar{x}_k, \bar{z}_k} \frac{1}{2}\{(\bar{z}_k - \bar{z})' Q_s (\bar{z}_k - \bar{z}) + (\bar{u}_k - \bar{u})' R_s (\bar{u}_k - \bar{u})\} \tag{4a}$$

subject to:

$$\bar{x}_k = A\bar{x}_k + B\bar{u}_k + B_d \hat{d}_{k|k} \tag{3b}$$

$$D\bar{u}_k - G\bar{x}_k \leq h \tag{3d}$$

$$\bar{z}_k = C_z(C\bar{x}_k + C_d \hat{d}_{k|k}) \tag{4b}$$

where Q is a positive definite matrix.

The steady state target input u*bar*k and the steady state target state x*bar*k can be calculated at each sampling time from the first or second quadratic programs above. For convenience of notation, the system variables are reparameterized with a stabilizing gain matrix K and deviation variables are defined as follows:

$$w_j = \hat{x}_{k+j|k} - \bar{x}_k, \; v_j = (u_{k+j} - \bar{u}_k) - Kw_j. \tag{5}$$

Using the deviation variables, an MPC optimization problem can be defined as:

$$\min_{w,v} \sum_{j=0}^{N-1} \frac{1}{2}\{w_j' Q w_j + v_j' R v_j + 2 w_j' M v_j\} + \frac{1}{2} w_N' P w_N \tag{6a}$$

subject to:

$$w_{j+1} = A_K w_j + B v_j, j=0,\ldots,N-1, \tag{6b}$$

$$Dv_j - G_K w_j \leq h - (D\bar{u}_k - G\bar{x}_k), j=0,\ldots,N-1, \tag{6c}$$

where $A_K$ is a strictly stable matrix defined as $A_K = A + BK$; $G_K$ is defined as $G_K = G - DK$; Q and P are positive semidefinite matrices; and R is a positive definite matrix.

In this formulation of the MPC optimization problem, the parameters which may change with each solution at each sampling time are $b_s$ and $w_0$, where:

$$b_s = [\bar{u}_k', \bar{x}_k']'.$$

The other quantities Q, R, M, P, $A_K$, B, D, G, and $G_K$ can be considered constant, i.e., independent of time. The state variables $$w = [w_1' \ldots w_N']'$$

can be eliminated by applying Equation (6b) to the MPC optimization problem, arriving at the following strictly convex quadratic program for the MPC optimization problem:

$$\min_v \frac{1}{2} v' H v + g' v \tag{7a}$$

subject to:

$$Av \geq b \tag{7b}$$

where H is a positive definite constant matrix; A is a constant matrix; and $$v = [v_0' \ldots v_{N-1}']'$$

The vectors g and b depend on the parameters $b_s$ and $w_0$ as follows:

$$g = G_w w_0 \tag{8a}$$

$$b = \bar{b} + B_s b_x + B_w w_0 \tag{8b}$$

where b*bar is a constant vector, and $G_w$, $B_s$, and $B_w$ are constant matrices.

Assuming the optimal solution v* obtained from the formulation of the MPC optimization problem of Equation (6) or (7), the first input $u_k$ is obtained from Equation (5) for injection into the system as:

$$u_k = \bar{u}_k + K w_0 + v_0^*, \tag{9}$$

Solving the model predictive control problem offline for the problem solutions in the partial parameter region includes solving the formulation of the MPC optimization problem of Equation (6) or (7) once at each sampling time. MPC optimization problems for consecutive sampling times differ only in the parameters $b_s$ and $w_0$. The unique solution to the strictly convex formulation of the MPC optimization problem of Equation (7) satisfies the following Karush-Kuhn-Tucker (KKT) optimality conditions for some choice of active constraint indices a, whose complement I denotes the inactive constraint indices:

$$Hv^* + g - A_a' \lambda_a^* = 0 \tag{10a}$$

$$A_a v^* = b_a \tag{10b}$$

$$A_I v^* \geq b_I \tag{10c}$$

$$\lambda_a^* \geq 0, \tag{10d}$$

Assuming that the matrix $A_a$ has full row rank, i.e., that the active constraints are linearly independent, Equations (10a) and (10b) provide a linear system with a square nonsingular coefficient matrix as follows:

$$\begin{bmatrix} H & -A'_a \\ A_a & 0 \end{bmatrix} \begin{bmatrix} v^* \\ \lambda_a^* \end{bmatrix} = \begin{bmatrix} -g \\ b_a \end{bmatrix}. \quad (11)$$

Equation (11) uniquely determines variables $v^*$ and $\lambda_a^*$.

The dependence of the formulation of the MPC optimization problem solely on the parameters $b_s$ and $w_0$ can be used to express the solution explicitly in terms of the parameters $b_s$ and $w_0$. The parameter region of ($b_s$, $w_0$) can be partitioned into polyhedral regions within which the parameters are valid. Substituting Equation (8) into the linear system of Equation (11) provides:

$$\begin{bmatrix} H & -A'_a \\ A_a & 0 \end{bmatrix} \begin{bmatrix} v^* \\ \lambda_a^* \end{bmatrix} = \begin{bmatrix} 0 \\ \bar{b}_a \end{bmatrix} + \begin{bmatrix} 0 \\ B_{as} \end{bmatrix} b_s + \begin{bmatrix} -G_w \\ B_{aw} \end{bmatrix} w_0, \quad (12)$$

where $\bar{b}_a$*bar, $B_{as}$, and $B_{aw}$ are row subvectors and submatrices corresponding to the active set a of problem solutions. Continuing with the assumption that the matrix $A_a$ has full row rank, the solution of Equation (12) depends linearly on the parameters $b_s$ and $w_0$, so that:

$$v^* = K_{as}b_s + K_{aw}w_0 + c_v, \quad (13a)$$

$$\lambda_a^* = L_{as}b_s + L_{aw}w_0 + c_\lambda, \quad (13b)$$

where $K_{as}$, $K_{aw}$, $L_{as}$, $L_{aw}$, $c_v$ and $c_\lambda$ depend on the active set a of problem solutions and problem data, such as the system matrices A, B, C, the weight matrices Q, R, M, P, and so forth, but not on the parameters $b_s$ and $w_0$. The region of validity of the solutions to Equation (13) can be determined from the unused optimality conditions of Equations (10c) and (10d). Substituting Equation (13) into the optimality conditions of Equations (10c) and (10d) provides explicit tests for the parameters as follows:

$$L_{as}b_s + L_{aw}w_0 + c_\lambda \geq 0, \quad (14a)$$

$$A_l K_{as}b_s + A_l K_{aw}w_0 + (A_l c_v - b_l) \geq 0, \quad (14b).$$

Those skilled in the art will appreciate that any technique with redundant constraint removal can be used to eliminate redundant inequalities in Equation (14). One example of such an algorithm is described in Tondel, Johansen, and Bemporad, *Automatica*, vol. 39, p. 489-497, 2003.

Solving the model predictive control problem for the problem solutions offline further includes calculating and storing the coefficient matrices and vectors of Equations (13) and (14) for a selected subset of possible active sets a of problem solutions that are valid active sets for some choice of the parameters $b_s$ and $w_0$. In one embodiment, it is not necessary to compute (13b). The parameters $b_s$ and $w_0$ can be selected for the initial anticipated operating state for the system, although the selection is not critical as new solutions are calculated and stored during regular operation when the system moves to a different operating state. The selected subset of possible active sets a of problem solutions is determined by solving the MPC problem for a training period over a desired number of sampling times to simulate MPC operation, while adding random disturbances and setpoint changes to force the MPC problem into the region of the parameters $b_s$ and $w_0$ for the initial anticipated operating state. Populating the solution table with the problem solutions includes storing the coefficient matrices and vectors of Equations (13) and (14) for a selected subset of possible active sets a of problem solutions in the solution table. Typically, the solution table is small and of fixed length, so the selected subset is small. The size of the solution table can be selected to be large enough to fit the range of optimal active sets a of problem solutions likely to be encountered for the current operating state. This maintains the number of times that the optimal solution is not found in the solution table to a reasonable level. Exemplary solution tables accommodate a selected subset for 50 to 200 possible active sets a of problem solutions. Those skilled in the art will appreciate that the number of possible active sets depends on the control horizon N and on the system dimensions n,m. These parameters can be used to compute an upper bound to the number of possible active sets, although this bound is often very conservative. In another embodiment, the solution table is allowed to grow with addition of new optimal active sets of problem solutions for solutions not initially stored in the solution table.

Scanning the solution table for an optimal solution for current parameters 220 includes determining the parameters $b_s$ and $w_0$ for the current operating state and checking the solution table for an active set a of problem solutions corresponding to the current parameters. The checking can be performed by using matrix-vector products to see whether the inequalities of Equation (14) hold for the active set a of problem solutions. The optimal $v^*$ can be calculated from Equation (13) for the identified active set a problem solution. When the optimal solution is in the solution table, the identified optimal solution is used to control the MIMO system 230.

When the optimal solution is not in the solution table, an alternative solution is used to control the MIMO system 240. Using an alternative solution when the optimal solution is not in the solution table to control the MIMO system 240 includes identifying an alternative solution such as a best suboptimal solution, a predetermined time current solution, a simplified model current solution, or the like. The alternative $v^*$ can be calculated from Equation (13) for the identified active set a problem solution.

The best suboptimal solution can be determined by scanning the solution table for an active set a problem solution that ensures the solution of the quadratic program is feasible, while violating the fewest possible inequalities for the system. Feasibility is assured by determining that the parameter test of Equation (14b) is satisfied, ensuring the solution to the strictly convex quadratic program for the MPC optimization problem of Equation (7) is feasible. Violation of the fewest possible inequalities is assured by determining that the active set a of problem solutions violates the fewest possible inequalities the parameter test of Equation (14a). Violations of the parameter test of Equation (14a) indicate that components of the Lagrange multiplier vector $\lambda_a$ have the wrong sign and that a better suboptimal solution can be obtained by releasing each corresponding constraint from its boundary. The suboptimal $v^*$ and $\lambda_a^*$ can be calculated from Equation (13) for the identified active set a problem solution.

A predetermined time current solution can be calculated by solving the MPC optimization problem of Equation (6) or (7) online for the optimal solution with the parameters $b_s$ and $w_0$ for the current operating state. To be useable as the alternative solution to the MPC problem, the calculation of the new solution can be completed within a predetermined time, such as within a sampling time. When the new solution cannot be completed within a predetermined time, a different alternative solution is used. However, the calculation for the full problem solution is also started and the corresponding optimal solution is inserted into the table whenever the calculation is completed.

A simplified model current solution can be calculated by solving a simplified version of the MPC optimization problem of Equation (6) or (7) online to find a simplified model current solution. The simplified version of the MPC optimization problem can have a shortened time horizon to find a shortened time horizon solution, additional constraints on the final state to find an additionally constrained solution, and/or other modeling simplifications to shorten the calculation time. Alternatively, a fall back solution can be obtained from the optimal solution computed at some previous decision time point.

The solution table can be managed to maintain a current selected subset of possible active sets a of problem solutions for the partial parameter region of the present operating condition. Maintaining a current selected subset reduces calculations at each sampling time since the optimal solution is likely to be found in the solution table. When the optimal solution is not in the solution table, a current solution to the model predictive control problem for the MIMO system for the current parameters can be calculated and added to the solution table, so that the solution is available at future sampling times. In one embodiment, the size of the solution table is allowed to increase. In another embodiment, an old problem solution can be deleted when the current solution is added to maintain the solution table at a predetermined length. Maintaining the solution table at a predetermined length assures that the scanning time does not become too large and that the storage space is conserved. The old problem solution that is deleted can be a least used solution or a least recently used solution. The least used solution can be determined by maintaining a use score for each of the problem solutions indicating how often the particular solution has been used. The least recently used solution can be determined by maintaining an age score for each of the problem solutions indicating how recently the particular solution has been used.

In one embodiment, the use score for each of the problem solutions can be determined over a predetermined number of sampling times and the scanning of the solution table for an optimal solution can proceed by scanning the problem solutions in order of the use score from most used to least used. In another embodiment, the age score for each of the problem solutions can be determined and the scanning of the solution table for an optimal solution can proceed by scanning the problem solutions in order of the age score from newest to oldest. In another embodiment when the optimal solution is not in the solution table, a solution family related to the current solution to the model predictive control problem for the MIMO system for the current parameters can be calculated and added to the solution table, so that the solution family is available at future sampling times.

Figure 3:
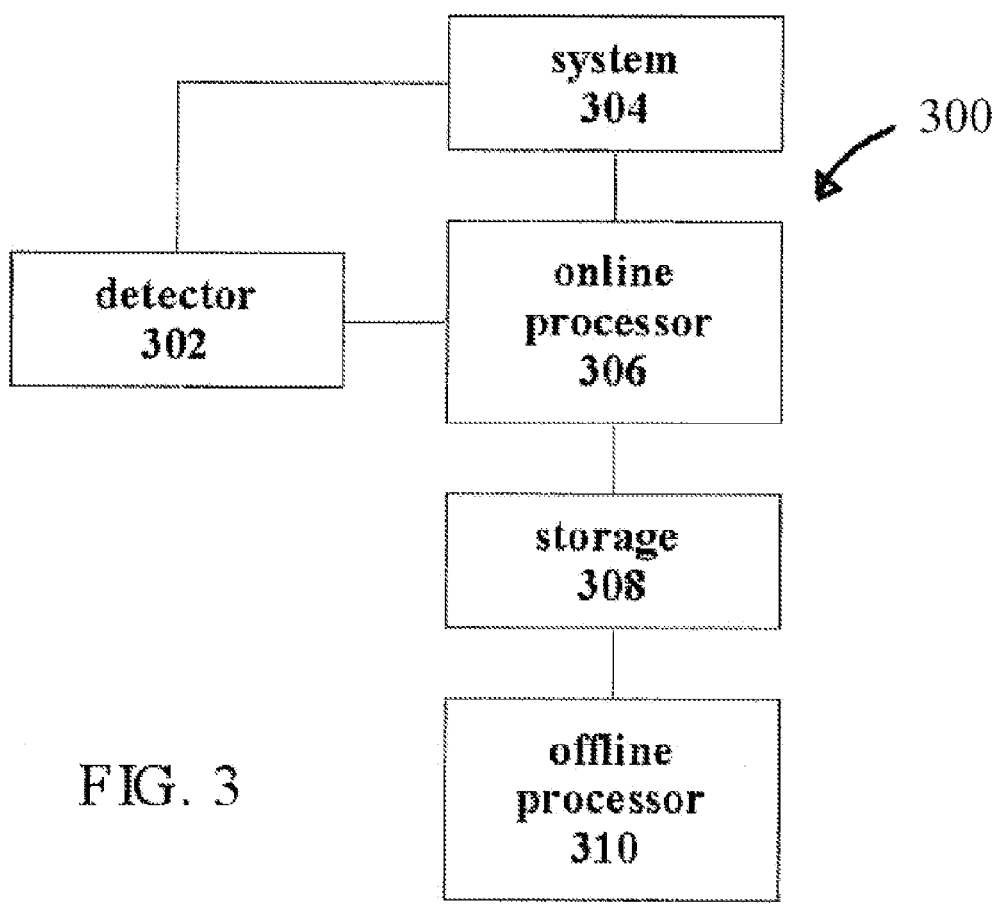
FIG. 3 is a hardware diagram of a MIMO model predictive controller made in accordance with the present invention.

FIG. 3 is a hardware diagram of a MIMO model predictive controller made in accordance with the present invention. The controller 300 includes a detector 302 providing a measured output from the system 304 to an online processor 306, which supplies an input to the system 304. The storage 308 stores problem solutions calculated by the offline processor 310 for use by the online processor 306.

The detector 302 is any detector capable of measuring the output from the system 304, such as fluid level, fluid flow, electrical voltage, electrical current, or any other measurable output. The offline processor 310 is any general purpose computer, dedicated computer, personal computer, or the like, including a computer readable medium storing a computer program for calculating the problem solutions as discussed for FIG. 2 above. The storage 308 is any computer readable medium, such as read only memory, random access memory, a memory device, a compact disc, a floppy disk, or the like, able to store the problem solutions and computer readable code storing a computer program for controlling operations of the online processor 306. The online processor 306 is any personal computer, microcontroller, microprocessor, or the like, programmed to calculate the optimal solution as discussed for FIG. 2 above. In various embodiments, the detector 302, online processor 306, storage 308, offline processor 310, and/or any combinations or subcombinations thereof are imprinted on a single chip, such as an Application Specific Integrated Circuit (ASIC).

In an alternative embodiment, both the offline processor 310 and the online processor 306 are different operations on a single computer. In another embodiment, the offline processor 310 is operational to update, adjust, and optimize the problem solutions while the online processor 306 is operating. In yet another embodiment, the offline processor 310 is inactive or removed from the controller 300 when the online processor 306 is operating.

The method of model predictive control for a MIMO system is illustrated by the following two exemplary simulations: a co-polymerization reactor and a crude distillation unit. The simulations were run on a 1.2 GHz personal computer with a Debian Linux operating system using the Octave high-level interactive language for numerical computations, available at www.octave.org. The function cputime was used to measure the computational time required. The partial enumeration method results were compared to the qpsol method results for the same problems from a commercial active-set solver qpsol used to solve the quadratic programs.

The first exemplary simulation is for a co-polymerization reactor for methyl methacrylate and vinyl acetate. The simulation uses a discrete state-space model with eighteen states, five inputs, and four outputs, which is a medium sized system. The inputs are the methyl methacrylate flow rate, vinyl acetate flow rate, initiator flow rate, transfer agent flow rate, and jacket temperature. The outputs are polymer production rate, mole fraction methyl methacrylate in the polymer, average polymer molecular weight, and reactor temperature. The normalized constraints on the inputs are:

$$[-0.18\ -0.18\ -0.02\ -0.02\ -0.18]' \leq u_k \leq [0.02\ 0.02\ 0.18\ 0.18\ 0.02]'.$$

The nominal online model was modified with the addition of unmeasured random bounded input step disturbances and unmeasured random output noise to simulate an actual plant. An (A, B, C) controller design model was augmented with an input disturbance model, using $B_d = [B_1, B_2, B_3, B_5]$ with $B_i$ as the ith column of B, $C_d = 0$, and a steady-state Kalman filter designed for the augmented system. The model predictive controller was designed with $Q = C'C$, $R = I$, $M = 0$, P as the corresponding Riccati penalty, and a time horizon of $N = 50$. Under this qpsol model, the MPC optimization problem of Equation (7) has 250 decision variables, 500 constraints, and $3^{250}$ (or $1.9 \times 10^{119}$) problem solutions over the total parameter region.

The partial enumeration method was simulated using 50, 100, and 200 problem solutions in the solution table and were labeled as TAB50, TAB100, and TAB200, respectively. The solution table was scanned in order of use score from most used to least used, with the use score being determined over a training period simulating 10 days of operation. When the optimal solution was not found in the solution table, a simplified model current solution with a shortened time horizon of $N = 5$ was calculated as an alternative solution. The simulation runs were for 22 days (or 31681 sampling times at one sample per minute) with ten random input disturbances and random output noise.

Figure 4:
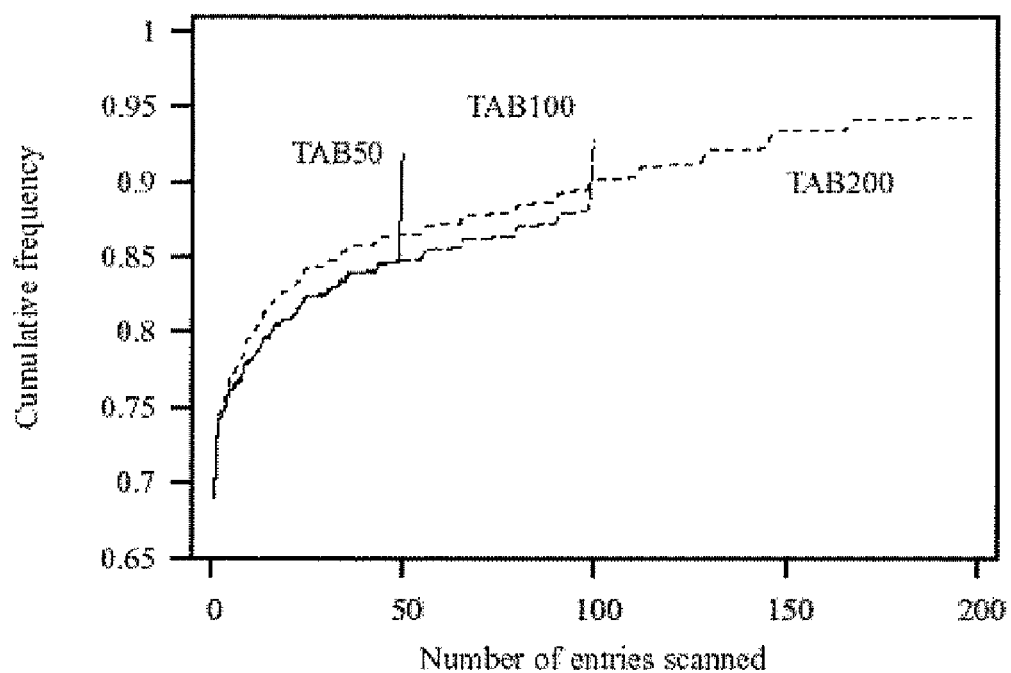
FIGS. 4 & 5 are simulation results showing the performance of a MIMO model predictive controller made in accordance with the present invention.
Figure 5:
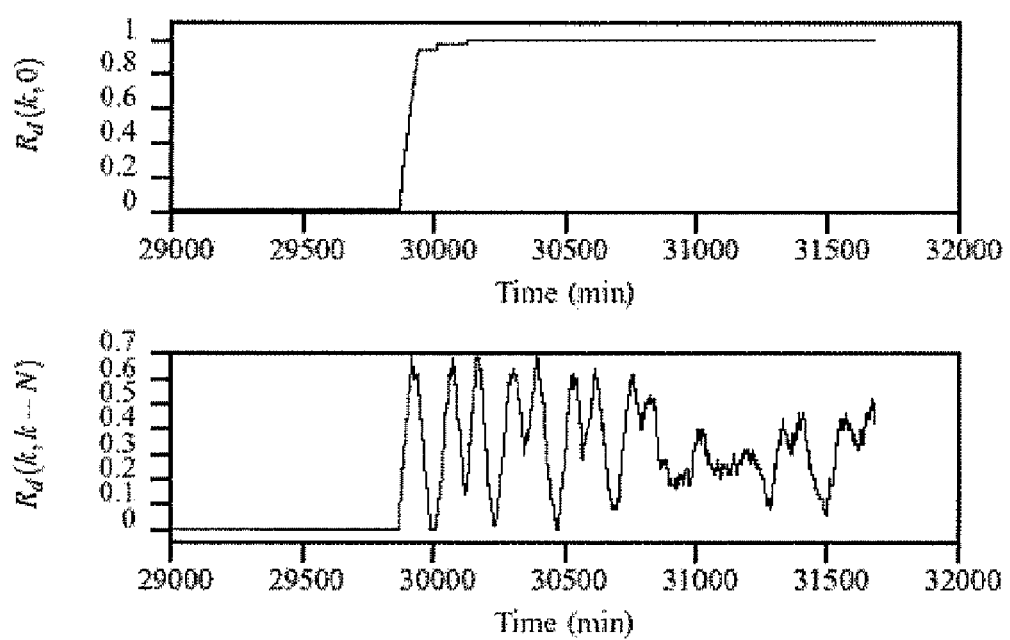

FIGS. 4 & 5 are simulation results showing the performance of a MIMO model predictive controller made in accordance with the present invention. FIG. 4 is a graph of cumulative frequency versus number of entries scanned for the simulation results showing the performance of a MIMO model predictive controller made in accordance with the present invention. Results are shown for each of the cases TAB50, TAB100, and TAB200. The graph demonstrates that the partial enumeration method using a limited number of problem solutions in the partial parameter region is sufficient to provide an optimal solution in most cases. In this example as shown in FIG. 4, 80 percent of the sampling times scanned twenty problem solutions or fewer before finding the optimal solution. Thus, a solution table with 50 problem solutions was sufficient to provide an optimal solution for a great majority of the sampling times. The optimal solution was found 91.8 percent of the time in a solution table with 50 problem solutions and 94.2 percent of the time in a solution table with 200 problem solutions.

Table 1 summarizes the performance of the partial enumeration method and the qpsol method. The table provides the maximum and average (mean) CPU time required to compute the optimal solution or the alternative solution when the optimal solution is not in the solution table. For the partial enumeration method cases TAB50, TAB100, and TAB200, the table also provides the total number of different active sets of problem solutions scanned during the simulation and a suboptimality rating. The suboptimality rating is defined as the ratio of the achieved to optimal closed-loop objective function, with 1.0 indicating optimal.

TABLE 1

|  | TAB50 | TAB100 | TAB200 | qpsol |
|---|---|---|---|---|
| Max time (sec.) | 0.144 | 0.278 | 0.463 | 1.56 |
| Mean time (sec.) | 0.0075 | 0.0098 | 0.0129 | 1.02 |
| Active sets visited | 771 | 814 | 877 | ... |
| Suboptimality | 1.0090 | 1.0088 | 1.0094 | ... |

From Table 1, the partial enumeration method typically runs 100 times faster than the qpsol method as indicated by the average CPU time, with negligible suboptimality. Even the slowest maximum time for the partial enumeration method is three times faster than the qpsol method. Use of the simplified model current solution with a shortened time horizon of N=5 as an alternative solution in about 8 percent of the sampling times had little effect on optimality. The suboptimality was less than 1 percent, while the suboptimality for the shortened time horizon case of N=5 used alone would be 5.2 percent.

FIG. 5 provides graphs of relative solution table differences for the TAB50 simulation versus time for the simulation results showing the performance of a MIMO model predictive controller made in accordance with the present invention. The relative solution table differences are defined as:

$$R_d(k, 0) = \frac{D(k, 0)}{N(k)}, R_d(k, k-N) = \frac{D(k, k-N)}{N(k)} \quad (15)$$

where $D(k,j)$ is the number of problem solutions in the solution table at sampling time k that were not in the solution table at sampling time j, $N(k)$ is the total number of problem solutions in the solution table at sampling time k. In this simulation $N(k)$ is constant because the solution table was previously populated at its maximum size. As indicated by the graph of $R_d(k,0)$, the initial 50 problem solutions in the solution table were the same for the first 30,000 minutes of the simulation, then the system moved into a different operating state so that new problem solutions were calculated and entered in the solution table. As indicated by the graph of $R_d(k, k-N)$, the number of problem solutions recently added to the solution table within the time horizon N increases and decreases when the system changes to different operating states. The relative solution table difference $R_d(k, k-N)$ returns to zero as the problem solutions in the solution table become suited to the different operating state, with different problem solutions acquiring higher use scores, new problem solutions being added to the solution table, and least used problem solutions being removed from the solution table.

The second exemplary simulation is for a crude distillation unit. The simulation uses a model with 252 states, 32 inputs, and 90 outputs, which is a large system. The inputs and outputs are normalized, with the inputs subject to the following constraints:

$$u_{min} \leq u_k \leq u_{max}$$

with $u_{max} - u_{min} = 2 \cdot 1_{32}$. Four outputs for the quality of the crude distillation unit side products have desired setpoints varying within [−0.1, 0.1].

To simulate an actual plant, the nominal online model used by the model predictive controller was modified with the addition of unmeasured random bounded disturbances on crude composition, fuel gas quality, and steam header pressure. An (A, B, C) controller design model was augmented with a mixed input-output disturbance model ($B_d$=[$B_1$, $B_2$, $B_3$, $B_5$] with $B_i$ as the ith column of B, $C_d \neq 0$) designed to assure detectability, and a steady-state Kalman filter designed for the augmented system. The model predictive controller was designed with Q=C'C, R=0.5 I, M=0, P as the corresponding Riccati penalty, and a time horizon of N=25.

Table 2 summarizes the results for a crude distillation unit.

TABLE 2

|  | TAB50 | TAB100 | TAB200 | qpsol |
|---|---|---|---|---|
| Max time (sec.) | 1.315 | 2.493 | 3.131 | 52.6 |
| Mean time (sec.) | 0.056 | 0.071 | 0.097 | 25.7 |
| Suboptimality | 1.0001 | 1.0001 | 1.0001 |  |

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of predictive control for a multiple input, multiple output(MIMO) system, the method employing at least one processor, comprising:
providing a solution table with problem solutions to a model predictive control problem for the MIMO system over a partial parameter region;
scanning the solution table with the at least one processor for an optimal solution for current parameters;
using the optimal solution to control the MIMO system when the optimal solution is in the solution table; and
using an alternative solution to control the MIMO system when the optimal solution is not in the solution table;
wherein the providing comprises:
modeling the MIMO system with model factors;

generating the model predictive control problem from the model factor;

determining the partial parameter for an expected operating state;

solving the model predictive control problem offline for the problem solutions in the partial parameter region; and population the solution table with the problem solutions.

2. The method of claim 1 wherein the generating comprises formulating a target calculation selected from the group consisting of linear objective functions, quadratic objective functions, hard constraint functions with precedence rank ordering, soft constraint functions, and multi-stage quadratic objective functions.

3. The method of claim 1 wherein the solving comprises:
adding random disturbances and setpoint changes to force the model predictive control problem into the partial parameter region; and
solving the model predictive control problem over a number of sampling times.

4. The method of claim 1 wherein the alternative solution comprises an alternative solution selected from the group consisting of a best suboptimal solution, a predetermined time current solution, and a simplified model current solution.

5. The method of claim 1 wherein the alternative solution comprises a simplified model current solution selected from the group consisting of a shortened time horizon solution and an additionally constrained solution.

6. The method of claim 1 further comprising:
calculating a current solution to the model predictive control problem for the MIMO system for the current parameters when the optimal solution is not in the solution table; and
adding the current solution to the solution table.

7. The method of claim 6 further comprising deleting one of the problem solutions.

8. The method of claim 6 further comprising adding a solution family related to the current solution to the solution table.

9. A computer readable medium storing a computer program for predictive control for a multiple input, multiple output (MIMO) system, comprising:
computer readable code for providing a solution table with problem solutions to a model predictive control problem for the MIMO system over a partial parameter region;
computer readable code for scanning the solution table for an optimal solution for current parameters;
computer readable code for using the optimal solution to control the MIMO system when the optimal solution is in the solution table; and
computer readable code for using an alternative solution to control the MIMO system when the optimal solution is not in the solution table;
wherein the computer readable code for providing comprises:
computer readable code for modeling the MIMO system with model factors;
computer readable code for generating the model predictive control problem from the model factors;
computer readable code for determining the partial parameter region for an expected operating state;
computer readable code for solving the model predictive control problem offline for the problem solutions in the partial parameter region; and
computer readable code for populating the solution table with the problem solutions.

10. The computer readable medium of claim 9 wherein the computer readable code for generating comprises computer readable code for formulating a target calculation selected from the group consisting of linear objective functions, quadratic objective functions, hard constraint functions with precedence rank ordering, soft constraint functions, and multi-stage quadratic objective functions.

11. The computer readable medium of claim 9 wherein the computer readable code for solving comprises:
computer readable code for adding random disturbances and setpoint changes to force the model predictive control problem into the partial parameter region; and
computer readable code for solving the model predictive control problem over a number of sampling times.

12. The computer readable medium of claim 9 wherein the alternative solution comprises an alternative solution selected from the group consisting of a best suboptimal solution, a predetermined time current solution, and a simplified model current solution.

13. The computer readable medium of claim 9 wherein the alternative solution comprises a simplified model current solution selected from the group consisting of a shortened time horizon solution and an additionally constrained solution.

14. The computer readable medium of claim 9 further comprising:
computer readable code for calculating a current solution to the model predictive control problem for the MIMO system for the current parameters when the optimal solution is not in the solution table; and
computer readable code for adding the current solution to the solution table.

15. The computer readable medium of claim 14 further comprising computer readable code for deleting one of the problem solutions.

16. The computer readable medium of claim 14 further comprising computer readable code for adding a solution family related to the current solution to the solution table.

17. A method of predictive control for a multiple input, multiple output (MIMO) system, the method employing at least one processor, comprising:
providing a solution table with problem solutions to a model predictive control problem for the MIMO system over a partial parameter region;
scanning the solution table with the at least one processor for an optimal solution for current parameters;
using the optimal solution to control the MIMO system when the optimal solution is in the solution table;
using an alternative solution to control the MIMO system when the optimal solution is not in the solution table;
calculating a current solution to the model predictive control problem for the MIMO system for the current parameters when the optimal solution is not in the solution table;
adding the current solution to the solution table; and
deleting one of the problem solutions, the deleting comprising deleting a problem solution selected from group consisting of a least used solution and a least recently used solution.

18. A method of predictive control for a multiple input, multiple output (MIMO) system, the method employing at least one processor, comprising:
providing a solution table with problem solutions to a model predictive control problem for the MIMO system over a partial parameter region;
scanning the solution table with the at least one processor for an optimal solution for current parameters;

using the optimal solution to control the MIMO system when the optimal solution is in the solution table;

using an alternative solution to control the MIMO system when the optimal solution is not in the solution table; and determining a use score for each of the problem solutions over a predetermined number of sampling times;

wherein the scanning comprises scanning the problem solutions in order of the use score from most used to least used.

19. A method of predictive control for a multiple input, multiple output (MIMO) system, the method employing at least one processor comprising:

providing a solution table with problem solutions to a model predictive control problem for the MIMO system over a partial parameter region;

scanning the solution table with the at least one processor for an optimal solution for current parameters;

using the optimal solution to control the MIMO system when the optimal solution is in the solution table;

using an alternative solution to control the MIMO system when the optimal solution is not in the solution table; and determining an age score for each of the problem solutions;

wherein the scanning comprises scanning the problem solutions in order of the age score from newest to oldest.

20. A computer readable medium storing a computer program for predictive control for a multiple input, multiple output (MIMO) system, comprising:

computer readable code for providing a solution table with problem solutions to a model predictive control problem for the MIMO system over a partial parameter region;

computer readable code for scanning the solution table for an optimal solution for current parameters;

computer readable code for using the optimal solution to control the MIMO system when the optimal solution is in the solution table;

computer readable code for using an alternative solution to control the MIMO system when the optimal solution is not in the solution table;

computer readable code for calculating a current solution to the model predictive control problem for the MIMO system for the current parameters when the optimal solution is not in the solution table;

computer readable code for adding the current solution to the solution table; and computer readable code for deleting one of the problem solutions;

wherein the computer readable code for deleting comprises computer readable code for deleting a problem solution selected from group consisting of a least used solution and a least recently used solution.

21. A computer readable medium storing a computer program for predictive control for a multiple input, multiple output (MIMO) system, comprising:

computer readable code for providing a solution table with problem solutions to a model predictive control problem for the MIMO system over a partial parameter region;

computer readable code for scanning the solution table for an optimal solution for current parameters;

computer readable code for using the optimal solution to control the MIMO system when the optimal solution is in the solution table;

computer readable code for using an alternative solution to control the MIMO system when the optimal solution is not in the solution table; and computer readable code for determining a use score for each of the problem solutions over a predetermined number of sampling times;

wherein the computer readable code for scanning comprises computer readable code for scanning the problem solutions in order of the use score from most used to least used.

22. A computer readable medium storing a computer program for predictive control for a multiple input, multiple output (MIMO) system, comprising:

computer readable code for providing a solution table with problem solutions to a model predictive control problem for the MIMO system over a partial parameter region;

computer readable code for scanning the solution table for an optimal solution for current parameters;

computer readable code for using the optimal solution to control the MIMO system when the optimal solution is in the solution table;

computer readable code for using an alternative solution to control the MIMO system when the optimal solution is not in the solution table; and computer readable code for determining an age score for each of the problem solutions;

wherein the computer readable code for scanning comprises computer readable code for scanning the problem solutions in order of the age score from newest to oldest.

* * * * *